Patented Apr. 3, 1923.

1,450,714

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed May 24, 1921. Serial No. 472,270.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While the ethers form thin solutions in the lower monohydroxy aliphatic alcohols or perchlorethylene, it has been found that such single solvents by themselves do not dissolve a sufficient proportion of the ethers to make a desirable thick flowable composition or dope, such as may be used in the manufacture of photographic film base by customary methods, or in the other plastic arts.

I have discovered that an adequately strong and useful solvent may be prepared by mixing perchlorethylene with one or more of the lower monohydroxy aliphatic alcohols. For example, I may use from 90 to 50 parts of perchlorethylene and 10 to 50 parts by weight of the alcohol, say methyl or ethyl alcohol as an illustration. In the preferred form of my invention, I use equal parts by weight of perchlorethylene and methyl or ethyl alcohol. While the amount of ether that may be dissolved in such mixed solvents may be varied as desired over a large range, it is noted, for the sake of example, that 1 part by weight of water-insoluble ethyl cellulose when dissolved in 5 parts of one of the above mixed or compound solvents yields a thick viscous flowable solution.

Other substances which impart additional suppleness, or incombustibility, or other qualities, to the film may also be added to the dope, such, for instance, as triphenyl or tricresyl phosphate, camphor, etc. In the formation of the film a considerable amount of perchlorethylene is left therein, due to its relatively low volatility. It imparts useful properties to such film.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter. By lower monohydroxy aliphatic alcohol I include one having less than six carbon atoms.

Having thus described my invention, what I claim as new and desire to secure by Letters Patent is:

1. A composition of matter, comprising cellulose ether dissolved in a mixture containing perchlorethylene and a lower monohydroxy aliphatic alcohol.

2. A viscous flowable composition, comprising an alkyl ether of cellulose dissolved in a solvent containing from 90 to 50 parts by weight of perchlorethylene and 10 to 50 parts of a lower monohydroxy aliphatic alcohol.

3. A composition of matter, comprising water-insoluble ethyl cellulose, perchlorethylene and methyl alcohol.

4. A composition of matter comprising cellulose ether and perchlorethylene.

5. A composition of matter comprising water-insoluble ethyl cellulose and perchlorethylene.

6. As an article of manufacture, a deposited or flowed flexible film containing cellulose ether and perchlorethylene.

Signed at Rochester, New York, this 14th day of May 1921.

STEWART J. CARROLL.